(12) United States Patent
Kuribayashi

(10) Patent No.: US 7,304,660 B2
(45) Date of Patent: Dec. 4, 2007

(54) OPTICAL BEAM SCANNING DEVICE AND DIAPHRAGM DEVICE CAPABLE OF ADJUSTING LIGHT QUANTITY DISTRIBUTION

(75) Inventor: Yasushi Kuribayashi, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 345 days.

(21) Appl. No.: 10/886,060

(22) Filed: Jul. 8, 2004

(65) Prior Publication Data
US 2005/0029438 A1   Feb. 10, 2005

(30) Foreign Application Priority Data
Jul. 11, 2003 (JP) ............................. 2003-195947

(51) Int. Cl.
*B41J 27/00* (2006.01)
(52) U.S. Cl. ........................................ 347/256
(58) Field of Classification Search ............... 347/256; 250/234; 359/216
See application file for complete search history.

(56) References Cited

U.S. PATENT DOCUMENTS

| | | | | |
|---|---|---|---|---|
| 3,438,704 A | * | 4/1969 | Schoen | 399/51 |
| 4,279,497 A | * | 7/1981 | Satomi | 399/198 |
| 5,161,047 A | * | 11/1992 | Tomita et al. | 359/216 |
| 2002/0057327 A1 | * | 5/2002 | Yoshida | 347/233 |
| 2004/0057098 A1 | * | 3/2004 | Kashimura | 359/216 |

FOREIGN PATENT DOCUMENTS

| | | | |
|---|---|---|---|
| JP | 02-236511 | * | 9/1990 |
| JP | 11-218702 A | | 8/1999 |
| JP | 2001-108926 A | | 4/2001 |
| JP | 2001-125033 A | | 5/2001 |
| JP | 2002-023092 A | | 1/2002 |

* cited by examiner

*Primary Examiner*—Hai Pham
*Assistant Examiner*—Carlos A. Martinez, Jr.
(74) *Attorney, Agent, or Firm*—Foley & Lardner LLP

(57) ABSTRACT

An optical beam scanning device of the present invention has a light source, a deflection reflecting surface for deflecting to scan light from the light source on a recording medium, and a diaphragm device which is provided between the light source and the deflection reflecting surface, and the diaphragm has an opening section formed by a nonplanar light shielding section. The light shielding section makes light shielding quantity of the light from the light source in a vertical scanning direction different in positions in a horizontal scanning direction and in a light advancing direction.

8 Claims, 13 Drawing Sheets

TOP VIEW

SIDE VIEW

CROSS SECTION TAKEN ALONG LINE A-A

TOP VIEW

SIDE VIEW

CROSS SECTION TAKEN ALONG LINE A-A

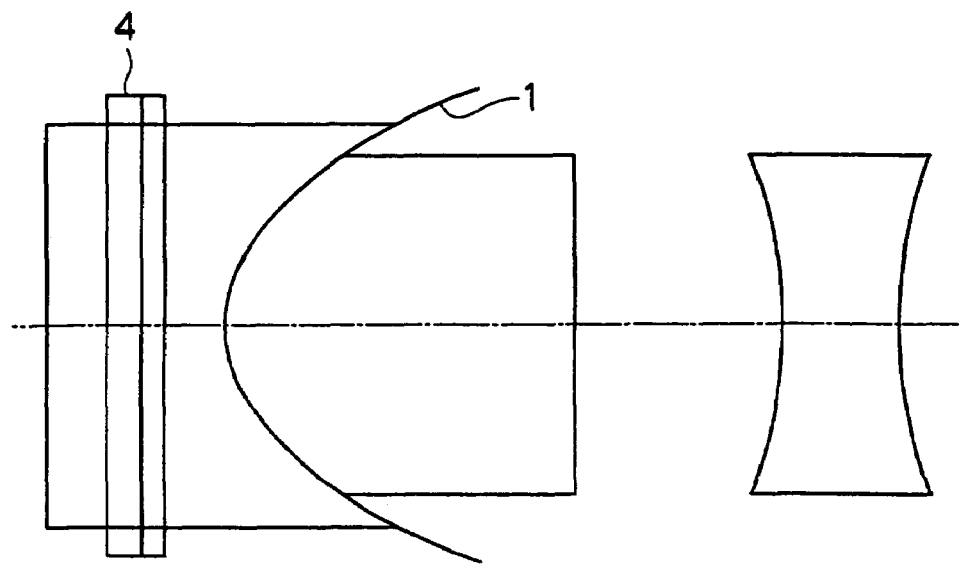
CURVED LINE SHAPE (FRONT INCIDENCE)
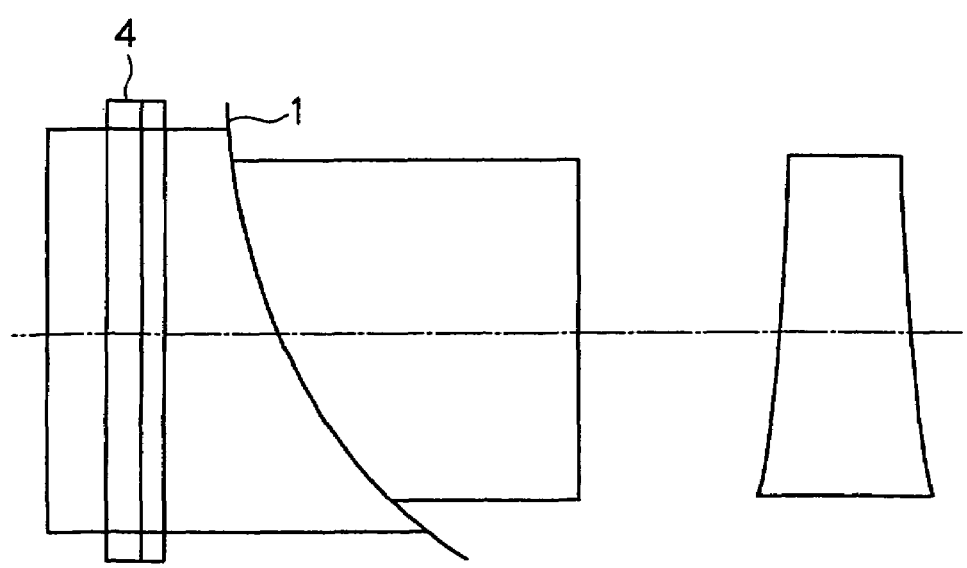
CURVED LINE SHAPE (GRAZING INCIDENCE)

CURVED LINE SHAPE
(FRONT INCIDENCE)

BINARY SHAPE
(FRONT INCIDENCE)

POLYGONAL SHAPE
(FRONT INCIDENCE)

CURVED LINE SHAPE
(GRAZING INCIDENCE)

BINARY SHAPE
(GRAZING INCIDENCE)

POLYGONAL SHAPE
(GRAZING INCIDENCE)

BINARY SHAPE (FRONT INCIDENCE)

BINARY SHAPE (GRAZING INCIDENCE)

CURVED LINE SHAPE
(FRONT INCIDENCE)

BINARY SHAPE
(FRONT INCIDENCE)

CURVED LINE SHAPE
(GRAZING INCIDENCE)

BINARY SHAPE
(GRAZING INCIDENCE)

TOP VIEW

SIDE VIEW

CROSS SECTION TAKEN ALONG LINE A-A

TOP VIEW

SIDE VIEW

CROSS SECTION TAKEN ALONG LINE A-A

OPTICAL BEAM SCANNING DEVICE AND DIAPHRAGM DEVICE CAPABLE OF ADJUSTING LIGHT QUANTITY DISTRIBUTION

BACKGROUND OF THE INVENTION

The invention relates to an optical beam scanning device and a diaphragm device. For example, the invention relates to the optical beam scanning device which is capable of adjusting light quantity distribution of laser beams reaching a scanning surface, and the diaphragm device for uniforming light quantity distribution of a light flux section of emitted light vertical to a light advancing direction.

Conventionally, optical scanning devices adopt roughly two kinds of systems for scanning light from light sources on recording media.

One of them is a system for allowing laser beams narrower than an image width of a reflecting surface of a rotating polygon mirror enter in a horizontal scanning direction and scanning them (hereinafter, "under field type"). The other one is a system for allowing laser beams wider than the image width of the reflecting surface of the rotating polygon mirror in the horizontal scanning direction enter and scanning a part of the laser beams cut off by the reflecting surface (hereinafter, "over field type").

In order to solve non-uniformity of light quantity distribution on recording media in the over field type optical beam scanning devices, conventionally, the following technique for correcting light quantity distribution on recording media is present.

Japanese Unexamined Patent Application Publication No. 11-218702 discloses that in the over field type optical beam scanning device, an aperture plate is provided between a collimating lens and a concave lens and an opening shape of the aperture plate is such that a length in a vertical scanning direction on both end positions in a horizontal scanning direction is larger than a length on a center position in the horizontal scanning direction.

Japanese Unexamined Patent Application Publication No. 2001-108926 discloses that in an over field type optical beam. scanning system, a slit member having a slit is provided on a halfway optical path between a light source and a polygon mirror and a slit shape is determined so that a light quantity for exposing positions on a surface to be scanned (on a recording medium) from a scanning start position to a scanning end position in one scanning becomes approximately constant.

Japanese Unexamined Patent Application Publication No. 2001-125033 discloses that in an over field optical beam scanning system, a diaphragm, in which an aperture diameter in a vertical scanning direction on at least one peripheral portion of a condensing lens system is wider than that at a center of the condensing lens system, is provided between a laser light source and a polygon mirror.

Japanese Unexamined Patent Application Publication No. 2002-023092 discloses that in order to uniform light quantity distribution on a recording medium in an over field type optical beam scanning device, a positional relationship between a rotating polygon mirror and a laser beam is set as follows. When an effective reflecting width of a reflecting surface of the rotating polygon mirror becomes small, a part of a laser beam with large light intensity distribution is reflected, and when the effective reflecting width of the reflecting surface becomes large, a part of the laser beam with small light intensity distribution is reflected.

In an actual laser beam, however, light intensity in Gaussian distribution disperses to a certain degree. In Japanese Unexamined Patent Application Publication Nos. 11-218702 (1999), 2001-108926 and 2001-125033, however, since a correcting amount of the light quantity distribution is fixed, these techniques cannot cope with dispersion of a laser beam.

In Japanese Unexamined Patent Application Publication No. 2002-023092, the light quantity distribution can be corrected in a device in which a change in the effective reflecting surface always increases or decreases (so-called over field type optical beam scanning device for grazing incidence). The light quantity distribution can be,however, corrected in only one of the cases where the change in the effective reflecting surface increases and decreases (so-called over field type optical beam scanning device for front incidence). Further, in Japanese Unexamined Patent Application Publication No. 2002-023092, a light quantity on a recording medium is reduced further towards a right end of a graph in the embodiment, and thus the light quantity is not completely corrected.

Further, in Japanese Unexamined Patent Application Publication No. 2002-023092, a displacement unit which enables an incident position of a laser beam to be displaced in a light scanning direction is provided so that adjustment is possible. Since a total number of parts increases and a light source is moved, however, locating of an optical axis becomes a problem.

SUMMARY OF THE INVENTION

It is an object of the present invention to provide an inexpensive diaphragm device with reliability which adjusts a light quantity of incident light and corrects light quantity distribution of emitted light so as to adjust its correcting amount, and an optical beam scanning device which is capable of correcting light quantity distribution on a recording medium considering after dispersion of light intensity in Gaussian distribution of light source light and an effective reflecting width of a reflecting surface of a rotating polygon mirror.

An optical beam scanning device from a first aspect of the invention is characterized by including: a light source; a deflection reflecting surface for deflecting to scan light from the light source on a recording medium; and a diaphragm device provided between the light source and the deflection reflecting surface, the diaphragm device having an opening section formed by a nonplanar light shielding section, the light shielding section making a light shielding quantity of the light from the light source in a vertical scanning direction different in positions of a light advancing direction.

An optical beam scanning device from a second aspect of the invention is characterized by including: a cylindrical lens for condensing light from a light source; a deflection reflecting surface for deflecting to scan the light from the light source on a recording medium; an aperture plate provided between the cylindrical lens and the deflection reflecting surface, its opening section on a surface having a shape such that a length in a direction crossing a horizontal scanning direction on both ends or one end in a scanning direction is larger than a length on a center portion in the scanning direction; and a movable adjustment section for shifting an installation position of the aperture plate and/or giving certain curvature to the aperture plate and thus a sectional shape in the horizontal scanning direction is a curved line shape so as to adjust light quantity distribution on the recording medium uniformly.

An optical beam scanning device from a third aspect of the invention is characterized by including: a light source; a deflection reflecting surface for deflecting to scan light from the light source on a recording medium; an aperture plate provided between the light source and the deflection reflecting surface, its opening section on a surface having a shape such that a length in a direction crossing a horizontal scanning direction on both ends or one end in a scanning direction is larger than a width on a center portion in the scanning direction, its sectional shape in the horizontal scanning direction being a two-dimensional shape; and a movable adjustment section for moving an installation position of the aperture plate and/or giving certain curvature to the aperture plate so that the sectional shape in the horizontal scanning direction is a curved line shape so as to adjust light quantity distribution on the recording medium uniformly.

A diaphragm device from a fourth aspect of the invention is characterized by including: an opening section on a surface of a nonplanar light shielding section, wherein the light shielding section shields light so that a position where incident light of converged/diverged light or parallel light is shielded is differed with a light advancing direction according to positions in a light section.

A diaphragm device from a fifth aspect of the invention is characterized by including: an opening section on a surface of a nonplanar light shielding section, wherein the light shielding section determines a quantity of incident light of converged/diverged light or parallel light to be shielded according to positions in a light section and positions of a light advancing direction.

According to the diaphragm device of the present invention, the light quantity of emitted light can be corrected and the correcting amount of the light quantity distribution of the emitted light can be adjusted with a simple and inexpensive constitution.

Further, according to the optical beam scanning device of the present invention, the correcting amount of the light quantity distribution on a recording medium can be adjusted by using the simple and inexpensive diaphragm device.

BRIEF DESCRIPTION OF THE DRAWINGS

FIGS. 4A and 4B are diagrams illustrating a shape of a passing laser beam from a aperture with a curved-line shape in the case of the front incidence according to the first embodiment;

FIGS. 5A and 5B are diagrams illustrating a shape of a passing laser beam from the aperture with a curved-line shape in the case of the grazing incidence according to the first embodiment;

DETAILED DESCRIPTION OF THE INVENTION

An optical beam scanning device and a diaphragm device according to preferred embodiments of the present invention are explained below with reference to the drawings.

The following embodiments explain the case where the diaphragm device of the present invention is applied to an over field type optical beam scanning device. The diaphragm device of the present invention is not limited to this, and can be applied also to light quantity adjustment of, for example, an image scanner, a printer, a facsimile, an MFP and a camera.

(A) Constitution of First Embodiment

The optical beam scanning device and the diaphragm device according to a first embodiment of the present invention are explained below with reference to FIGS. 1 to 11.

In the first embodiment, the diaphragm device of the present invention is applied to the over field type optical beam scanning device, and the diaphragm device is provided between a cylindrical lens and a rotating polygon mirror. The diaphragm device adjusts a light quantity of emitted light so that light quantity distribution on a recording medium is finally uniformed.

Figure 1:
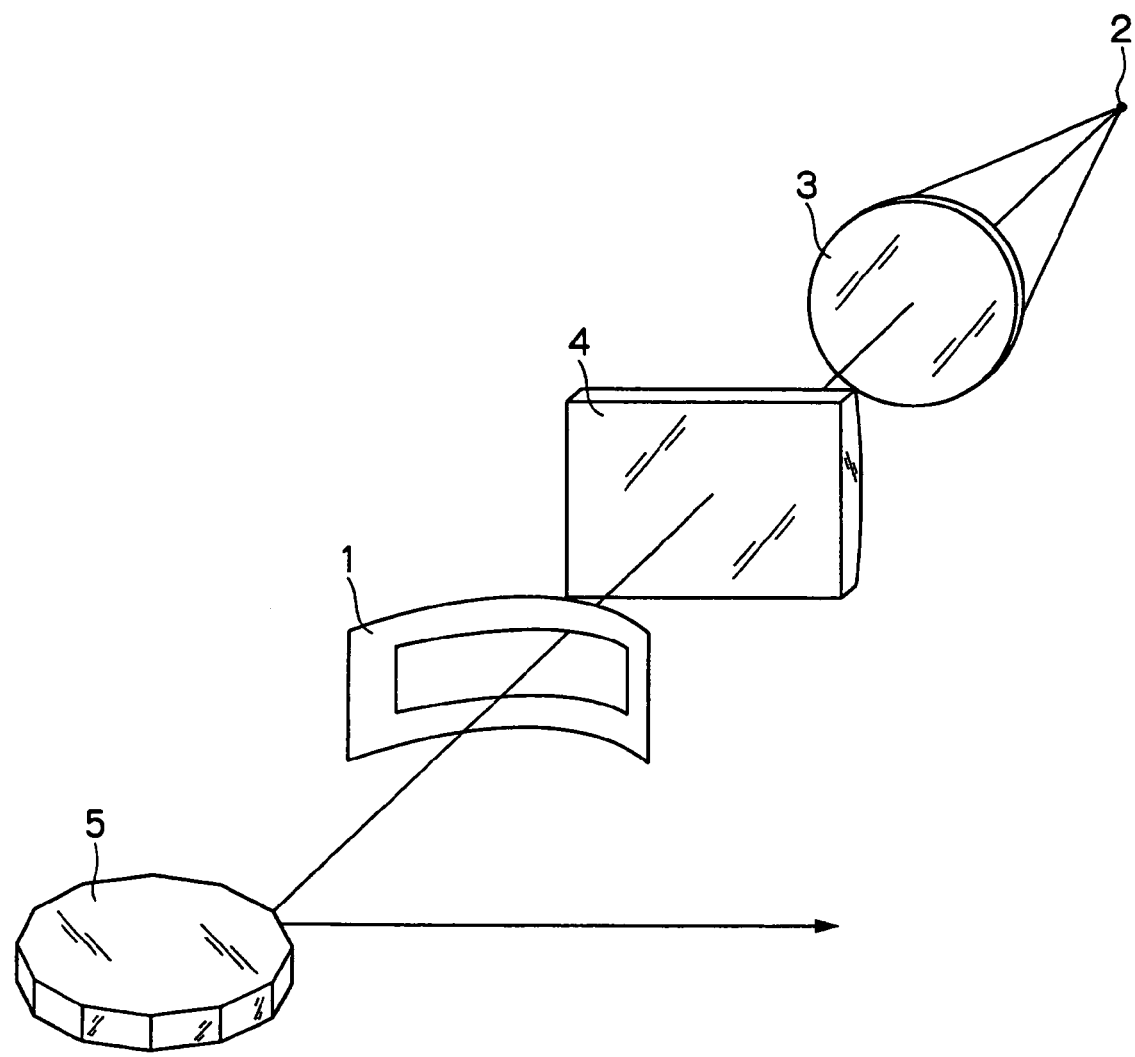
FIG. 1 is a constitutional diagram illustrating a constitution of an optical beam scanning device according to a first embodiment.

FIG. 1 is a constitutional diagram illustrating a constitution of an optical beam scanning device of this embodiment. As shown in FIG. 1, the optical beam scanning device of the embodiment has an aperture (opening member) 1, a laser light source 2, a collimating lens 3, a cylindrical lens 4, and a rotating polygon mirror 5.

The aperture 1 of the embodiment corresponds to the diaphragm device of the present invention.

The laser light source 2 is composed of, for example, a semiconductor laser or the like, and is an emitting unit for emitting a laser beam.

The collimating lens 3 converts a laser beam as diverged light emitted from the laser light source 2 into parallel light.

The cylindrical lens 4 condenses the laser beam from the collimating lens 3 to a vertical scanning direction.

The rotating polygon mirror 5 reflects a laser beam whose light quantity is adjusted by the aperture 1, by a reflecting surface so as to emit the laser beam to a recording medium, not shown.

The aperture 1 has an opening section at the center of one plate such as elastic sheet metal so as to be formed into a two-dimensional shape having curvature in a light advancing direction. In the embodiment, the opening section of the aperture 1 has a rectangular shape, but the shape of the opening section is not particularly limited.

Hereinafter, the opening section of the aperture 1 means an opening section on a surface extended portion of the shape of the aperture 1. Even when the aperture 1 has a two-dimensional shape, the opening section is an opening on the surface of the shape of the aperture 1. The opening section of the aperture 1 includes an optical opening to which transmitting glass, resin or the like is attached.

The aperture 1 is provided between the cylindrical lens 4 and the rotating polygon mirror 5, and allows light positioned on the opening section in a light flux (vertical section in the light advancing direction) of the light (converged light) from the cylindrical lens 4 to pass therethrough. The aperture 1 shields light positioned in portions other than the opening section (the shielding portion of the aperture 1 is called as a light shielding section). In the embodiment, the aperture 1 is provided between the cylindrical lens 4 and the rotating polygon mirror 5, but its installation position is not limited as long as it is between the light source 1 and the rotating polygon mirror 5. The aperture may be provided between, for example, the light source 2 and the collimating lens 3 so as to be applied to diverged light. Further, the aperture 1 may be provided between, for example, the collimating lens 3 and the cylindrical lens so as to be applied to parallel light.

The aperture 1 has, as mentioned above, the two-dimensional shape in the light advancing direction. For this reason, the light from the cylindrical lens 3 is shielded at different timings according to positions in a horizontal scanning direction of a light flux section vertical to the light advancing direction.

That is to say, when the opening section of the aperture 1 has the rectangular shape in which its height in the vertical scanning direction is uniform on entire area in the horizontal scanning direction like the embodiment, as the timing at which the light is shielded by the aperture 1 (light shielding timing) get later, a condensing distance of the laser beam passing through the opening section of the aperture 1 can be longer and a degree of the light shielding in the vertical scanning direction can be decreased. For this reason, the light shielding timing gets later, the light quantity of the light passing through the opening section in the vertical scanning direction can be increased.

According to this, the aperture 1 has such a two-dimensional shape that the light shielding timing gets later on a portion where the light intensity of a laser beam in the Gaussian distribution is weak than that on a portion where the light intensity is strong. A sectional shape of a light flux passing through the opening section of the two-dimensional aperture 1 (a projected shape of the passing light on a certain virtual surface after passing) is determined so that a length in the vertical scanning direction becomes larger in a position where the light shielding timing is comparatively late or a length in the vertical scanning direction becomes small in a position where the light shielding timing is comparatively early. As a result, the light quantity can be corrected so that the light quantity distribution on a recording medium becomes uniform.

Similarly, the aperture 1 has a such a shape that the light shielding timing gets later on a portion where an effective reflecting width of the reflecting surface of the rotating polygon mirror 5 is narrower than on a portion where the effective reflecting width of the reflecting surface of the rotating polygon mirror 5 is wide.

Figure 2A:
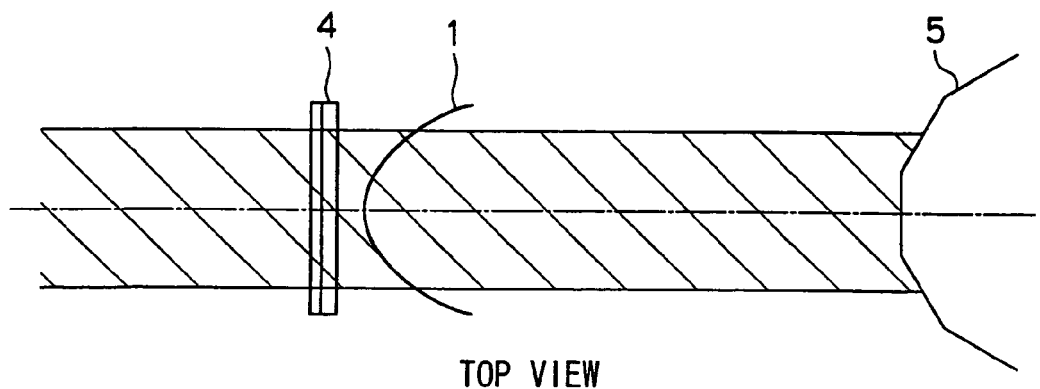
FIGS. 2A to 2C are explanatory diagrams explaining an example of an aperture shape and a state of a passing laser beam in the case of front incidence according to the first embodiment.
Figure 2B:
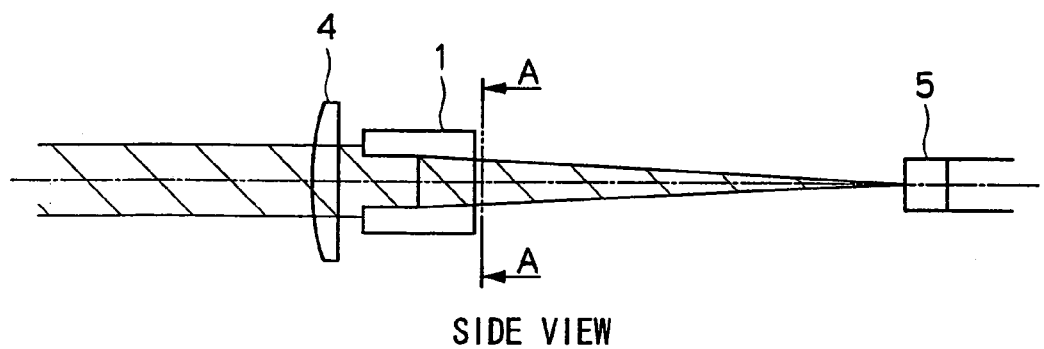
Figure 2C:
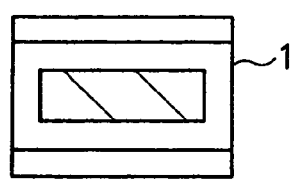
Figure 3A:
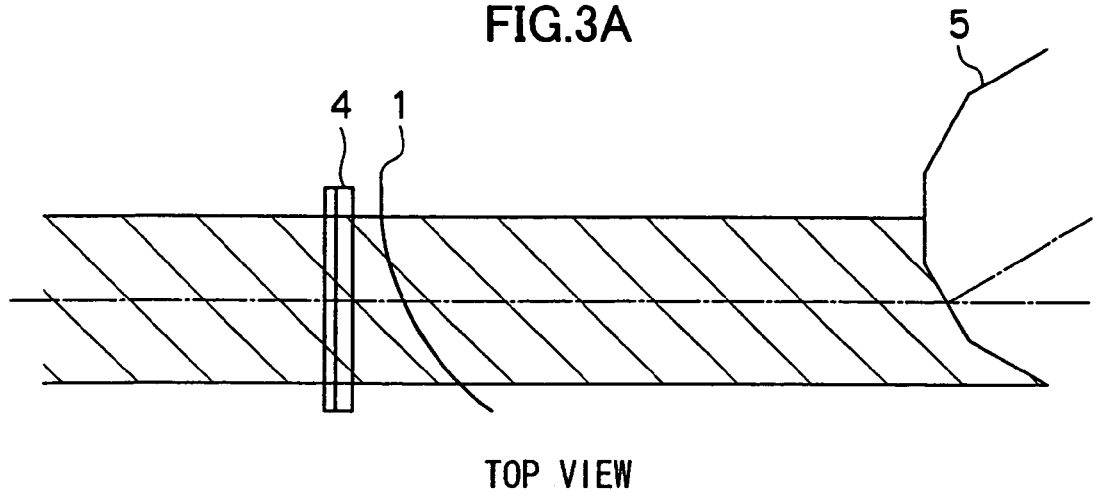
FIGS. 3A to 3C are explanatory diagrams explaining an example of the aperture shape and a state of the passing laser beam in the case of grazing incidence according to the first embodiment.
Figure 3B:
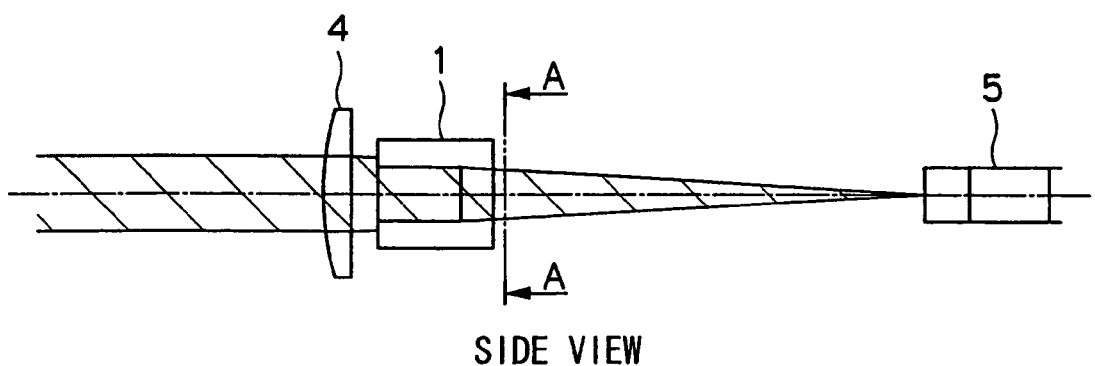
Figure 3C:
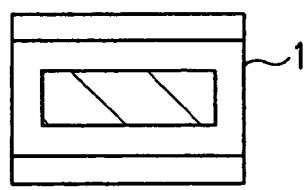

FIGS. 2A to 2C are diagrams explaining an example of a curved line shape of the aperture 1 and a state of a passing laser beam from the aperture 1 to the rotating polygon mirror 5 in the case of front incidence. FIGS. 3A to 3C are diagrams explaining an example of the curved line shape of the aperture 1 and a state of the passing laser beam from the aperture 1 to the rotating polygon mirror 5 in the case of grazing incidence.

FIG. 2A is a top view in which advance of the light beam is viewed from a top of the optical beam scanning device, FIG. 2B is a side view in which the advance of the light beam is viewed from a side of the optical beam scanning device, and FIG. 2C is a sectional view in which a section taken along line A-A of FIG. 2B is viewed from a side of the rotating polygon mirror 5.

As shown in FIG. 2A, in the case of the front incidence, the sectional shape of the aperture 1 in the horizontal scanning direction (hereinafter, the shape of the aperture 1) is a curved line shape having uniform curvature on both ends.

This shape is determined after the following is taken into consideration. In the case of the front incidence, the reflecting surface of the rotating polygon mirror 5 reflects light to a recording medium symmetrically with respect to an optical axis of incident light. The effective reflecting width of the reflecting surface due to rotation of the rotating polygon mirror 5 and the light intensity of the incident light entering the reflecting surface in the Gaussian distribution become maximum when an oscillation angle of the reflecting surface on the optical axis of the incident light becomes 0°. The effective deflecting width and the light intensity become smaller as the reflecting surface and the optical axis of the incident light form the oscillation angle.

In order to uniform the light quantity on a recording medium, therefore, the aperture 1 has the curved line shape having uniform curvature on both ends. As a result, the sectional shape of the light flux passing through the opening section is such that a height of both the ends in the vertical scanning direction is larger than a height of the center portion in the vertical scanning direction.

FIGS. 3A to 3C correspond to FIGS. 2A to 2C.

In FIG. 3A, the aperture 1 in the case of the grazing incidence has the curve line shape having large curvature in a direction where the reflecting effective width of the rotating polygon mirror 5 decreases. Needless to say, the shape of the aperture 1 is not limited to this, and for example, the aperture 1 may be formed considering the light intensity in Gaussian distribution of a laser beam reflected by the reflecting surface of the rotating polygon mirror.

Similarly to the case of the front incidence, the effective reflecting width of the reflecting surface due to the rotation of the rotating polygon mirror 5 and the light intensity in the Gaussian distribution of the incident light entering the reflecting surface are taken into consideration.

The sectional shape of the light flux passing through the opening section of the aperture 1 shown in FIGS. 2A to 3C is explained with reference to FIGS. 4A to 5B. FIGS. 4A and 4B illustrate the case of the front incidence, and FIGS. 5A and 5B illustrate the case of the grazing incidence.

As shown in FIGS. 4A and 4B or 5A and 5B, curvature is given to the shape of the aperture 1 so that the light shielding timing is adjusted. As a result, the sectional shape of the light flux passing through the aperture 1 is such that the length of both the ends or one end in the vertical scanning direction is larger than the length of the center portion in the vertical scanning direction. The light quantity on a portion where the light intensity in the light quantity distribution is weak can be corrected.

Modified examples of the shape of the aperture 1 are explained below with reference to FIGS. 6A to 9B.

Figure 6A:
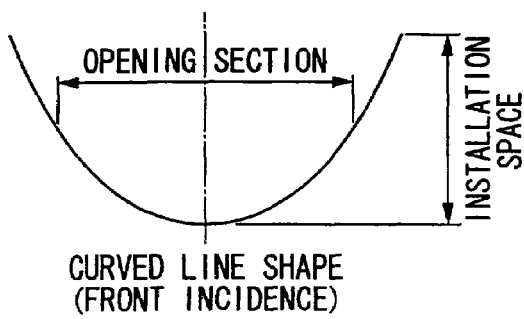
FIGS. 6A to 6C are diagrams illustrating a modified example of the aperture shape in the case of the front incidence according to the first embodiment.
Figure 6B:
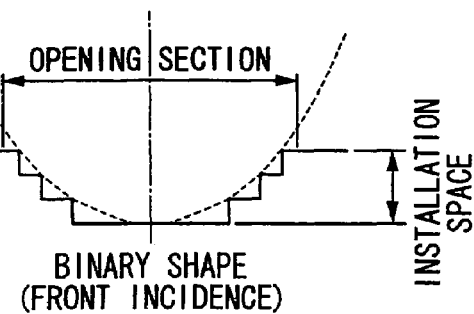
Figure 6C:
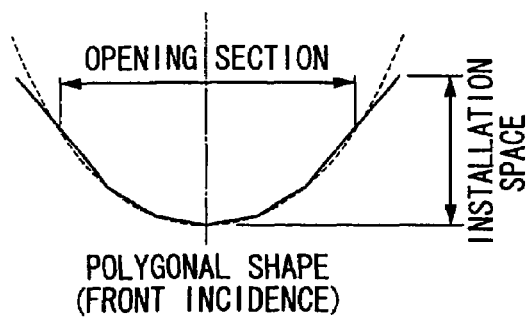
Figure 7A:
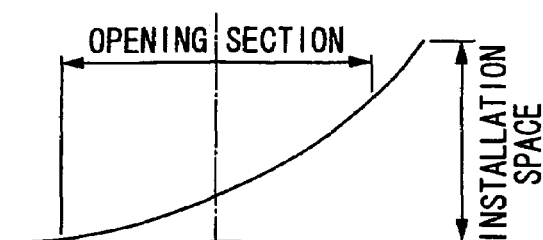
FIGS. 7A to 7C are diagrams illustrating a modified example of the aperture shape in the case of the grazing incidence according to the first embodiment.
Figure 7B:
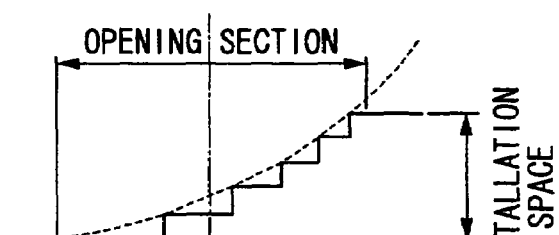
Figure 7C:
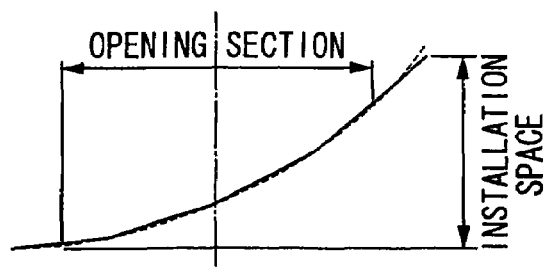

FIGS. 6A to 6C illustrate modified examples of the shape of the aperture 1 in the case of the front incidence, and FIGS. 7A to 7C illustrate modified examples of the shape of the aperture 1 in the case of the grazing incidence.

FIGS. 6A and 7A illustrate the above-mentioned curved line shape, and FIGS. 6B, 6C, 7B and 7C illustrate modified examples of the shape of the aperture 1.

In the modified examples shown in FIGS. 6B and 7B, the shapes are determined considering an installation space in the optical beam scanning device, and the sectional shape in the horizontal scanning direction is composed of a plurality of binary shapes (stepped shape).

When the curved line shape of FIGS. 6A and 7A is provided, one flat plate is provided with curvature so as to have the curved line shape. For this reason, the installation space of the aperture 1 becomes large.

In order to solve this problem, the aperture 1 has the binary shape shown in FIGS. 6B and 7B, so that the installation space can be smaller than the case of the curved line shape.

In the case where the aperture 1 has the curved line shape, locating (fulcrum) places should be increased in order to create a complicated curvature shape which can completely correct the light quantity distribution of a laser beam. In the case of the binary shape, however, for example, the aperture 1 is manufactured by press work or the like so that a stable shape can be easily created.

In the case where the aperture 1 has the binary shape, the sectional shape of the light flux passing through the opening section of the aperture 1 is as shown in FIGS. 8A to 9B.

Figures 8A, 8B:
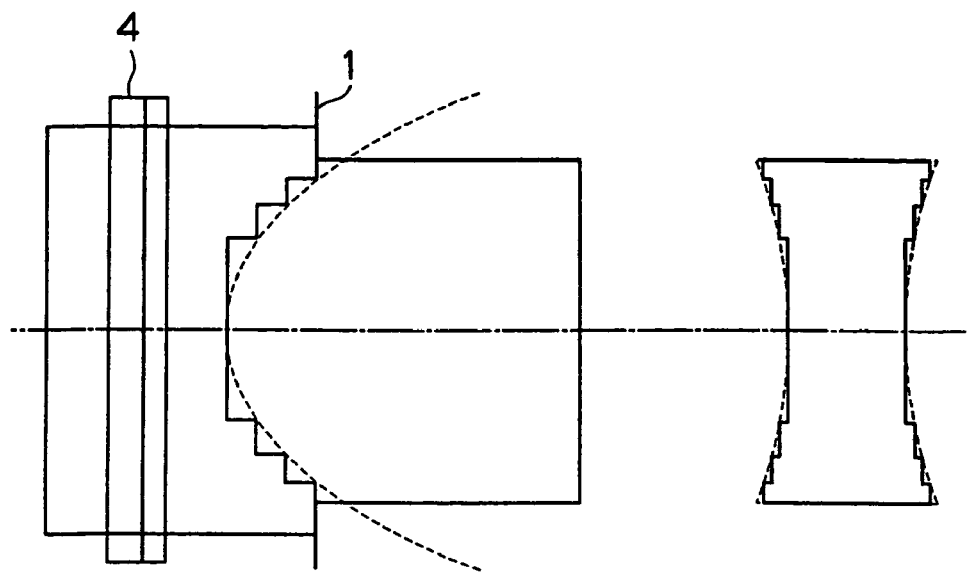
FIGS. 8A and 8B are diagrams illustrating a shape of a laser beam emitted from a binary-shaped aperture in the case of the front incidence according to the first embodiment.
Figures 9A, 9B:
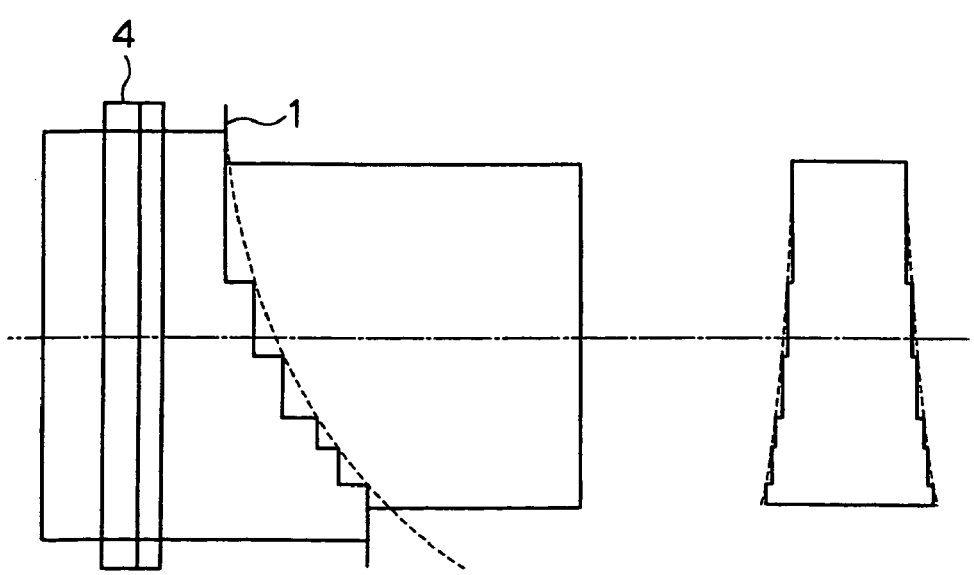
FIGS. 9A and 9B are diagrams illustrating a shape of a laser beam emitted from the binary-shaped aperture in the case of the grazing incidence according to the first embodiment.

FIGS. 8A and 8B illustrate the sectional shape of the light flux passing through the opening section of the aperture 1 in the case of the front incidence, and FIGS. 9A and 9B illustrate the sectional shape in the case of the grazing incidence.

As shown in FIGS. 8A and 8B, the sectional shape of the light flux in the case of the binary shape is approximate to the sectional shape of the light flux in the case of the curved line shape in FIG. 4B, and can obtain a performance which is close to that of the curved line shape. When a number of steps in the binary shape is increased, the performance which is closer to that of the curved line shape can be obtained. In the case of the binary shape, corners of the steps may be inscribed in or circumscribed about the above-mentioned curved line, or a midpoint of a side of the step in the horizontal scanning direction may pass through the curved line.

Also in the case of FIGS. 9A and 9B, the sectional shape of the light flux in the case of the binary shape is approximate to the sectional shape of the light flux in the case of the curved line shape in FIG. 5B, so that the performance close to that of the curved line shape can be obtained.

With reference to FIGS. 6A to 7C, the modified examples of the aperture 1 shown in FIGS. 6C and 7C are explained.

In FIGS. 6C and 7C, the polygonal shapes are inscribed in or circumscribed about the curved line with respect to the light advancing direction, or midpoints of the sides pass through the curved line so that the polygonal shapes are approximate to the curved line shapes in FIGS. 6A and 7A.

The polygonal shapes in FIGS. 6C and 7C can reduce the installation space similarly to the binary shape, and can provide the performance close to that of the curved line shape. In this case, as a number of corners to be set increases further, the performance which is closer to that of the curved line shape can be obtained.

The case where the above-mentioned aperture 1 adjusts the correcting amount of the light quantity distribution on a recording medium is explained below with reference to FIGS. 10A to 11B.

According to the adjusting method for the correcting amount of the light quantity distribution on a recording medium in the embodiment, the shape of the above-mentioned aperture 1 is modified and the installation position of the aperture 1 is moved, so that the light quantity distribution on the recording medium is corrected.

Figure 10A:
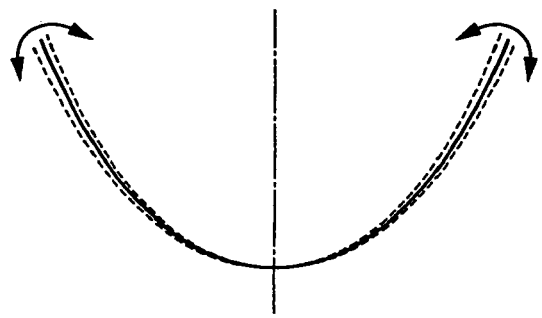
FIGS. 10A to 10D are explanatory diagrams explaining modified examples of the aperture shape according to the first embodiment.
Figure 10B:
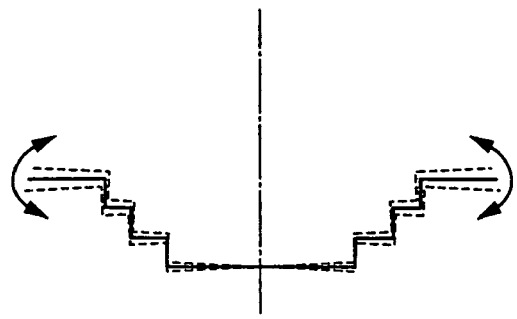
Figure 10C:
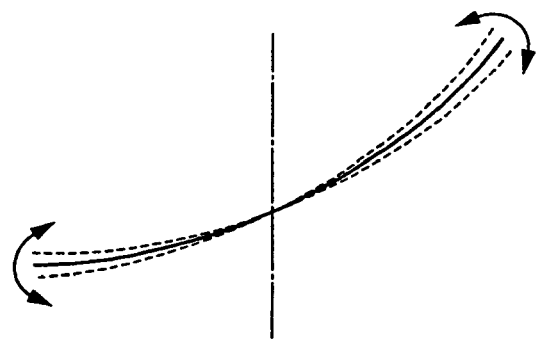
Figure 10D:
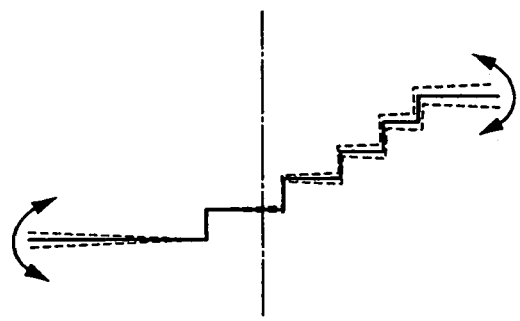

FIGS. 10A to 10D illustrate examples where the shape of the aperture 1 is modified. FIG. 10A illustrates the example where the curved line shape of the front incidence is modified, and FIG. 10B illustrates the example where the binary shape of the front incidence is modified. FIG. 10C illustrates the example where the curved line shape of the grazing incidence is modified, and FIG. 10D illustrates the example where the binary shape of the grazing incidence is modified.

As shown in FIGS. 10A to 10D, a moment to the vertical scanning direction is given to both the ends or one end of the aperture 1 by, for example, deforming adjustment units 20 shown in FIG. 11 for optimization. As a result, the shape of the aperture 1 is changed, and the correcting amount in the light quantity distribution of the laser beam passing through the aperture 1 in the horizontal scanning direction can be adjusted.

FIGS. 10A to 10D illustrate the case where the moment to the vertical scanning direction is given so that the aperture 1 is deformed. A load may be, however, applied to the aperture 1 from any direction as long as the aperture 1 is deformed and thus a phase of the light shielding can be changed. For example, a load of the light advancing direction or its opposite direction is applied to any one of the upper end or the lower end of the aperture 1 in the vertical scanning direction so that the aperture 1 may be bent in the vertical scanning direction.

Figure 11A:
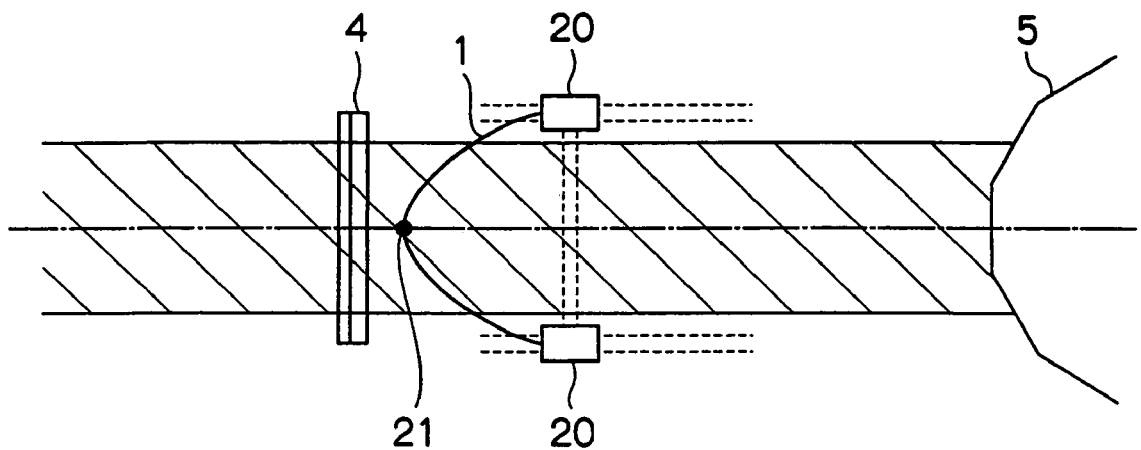
FIGS. 11A and 11B are explanatory diagrams explaining a modifying operation of the curved-line aperture according to the first embodiment.
Figure 11B:
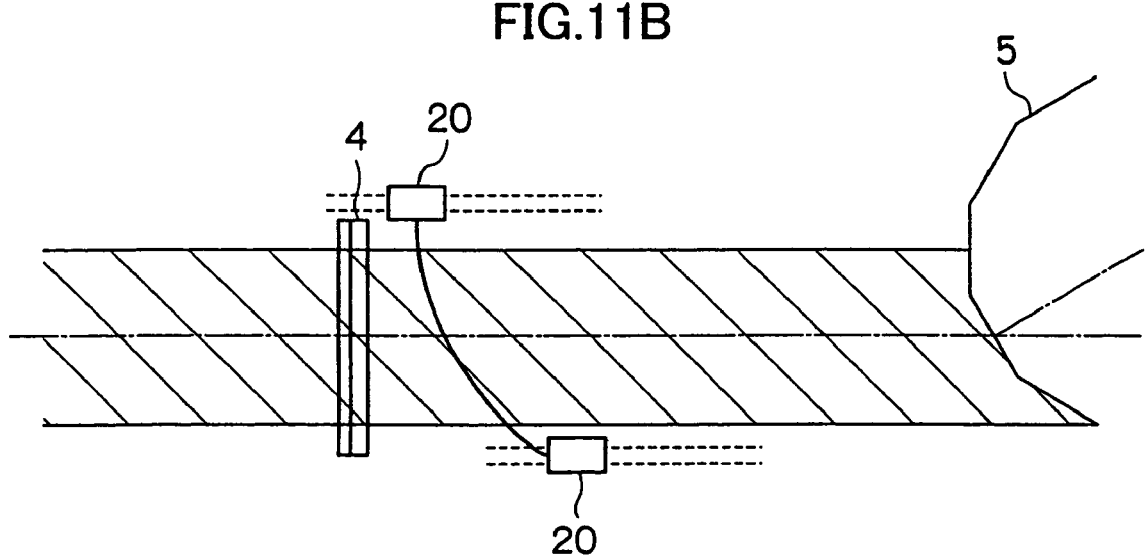

The deforming adjustment units 20 for deforming the shape of the aperture 1 shown in FIGS. 11A and 11B may, for example, adjust the moment to be given to the aperture 1 based on a light quantity measured result obtained by a sensor provided in the vicinity of the recording medium. For example, in the case of the front incidence shown in FIG. 11A, scanning angles with respect to the optical axis of the incident light are symmetrical in the horizontal scanning direction. For this reason, a fixed point 21 (for example, a protrusion) for fixing the aperture 1 is provided in a position where the light flux of the incident light is not disturbed and the deforming adjustment units 20 on both the ends cooperate so as to modify the aperture.

In the case where the installation position of the curved line-shaped aperture 1 for the front incidence is adjusted, the installation position of the aperture 1 can be moved parallel with the optical axis or to a direction vertical to the optical axis. When the installation position of the aperture 1 is moved, a diameter of the passing laser beam changes, but an absolute quantity of the light quantity in the entire scanning area can be adjusted. Further, any one end of the aperture 1 is moved to the horizontal scanning direction, balance of the right and left light quantity of the emitted laser beam can be adjusted.

The installation position of the aperture 1 may be shifted by the deforming adjustment units 20 shown in FIGS. 11A and 11B. The deforming adjustment units 20 in this case may, for example, adjust the installation position of the aperture 1 so that the installation position shift back and forth in the light advancing direction or its opposite direction based on the light quantity measured result obtained by the sensor in the vicinity of the recording medium. In the case of the front incidence of FIG. 11A, the fixed point 21 is cooperated with the deforming adjustment units 20 on both the ends so that the installation position of the aperture 1 can be shifted without changing the curvature of the aperture 1.

According to the first embodiment, the aperture 1 having the two-dimensional sectional shape in the horizontal scanning direction is provided between the cylindrical lens 4 and the rotating polygon mirror 5. As a result, the light quantity of the light from the cylindrical lens 4 can be adjusted so that the light quantity distribution on a recording medium becomes uniform.

Further, the sectional shape of the aperture 1 in the horizontal scanning direction is deformed, and/or the installation position of the aperture 1 is shifted, so that the correcting amount of the light quantity distribution can be adjusted.

(B) Constitution of Second Embodiment

The case where optical beam scanning device and the diaphragm device according to a second embodiment of the present invention are applied to an over field type optical beam scanning device is explained below with reference to FIGS. 12 to 14C.

Figure 12:
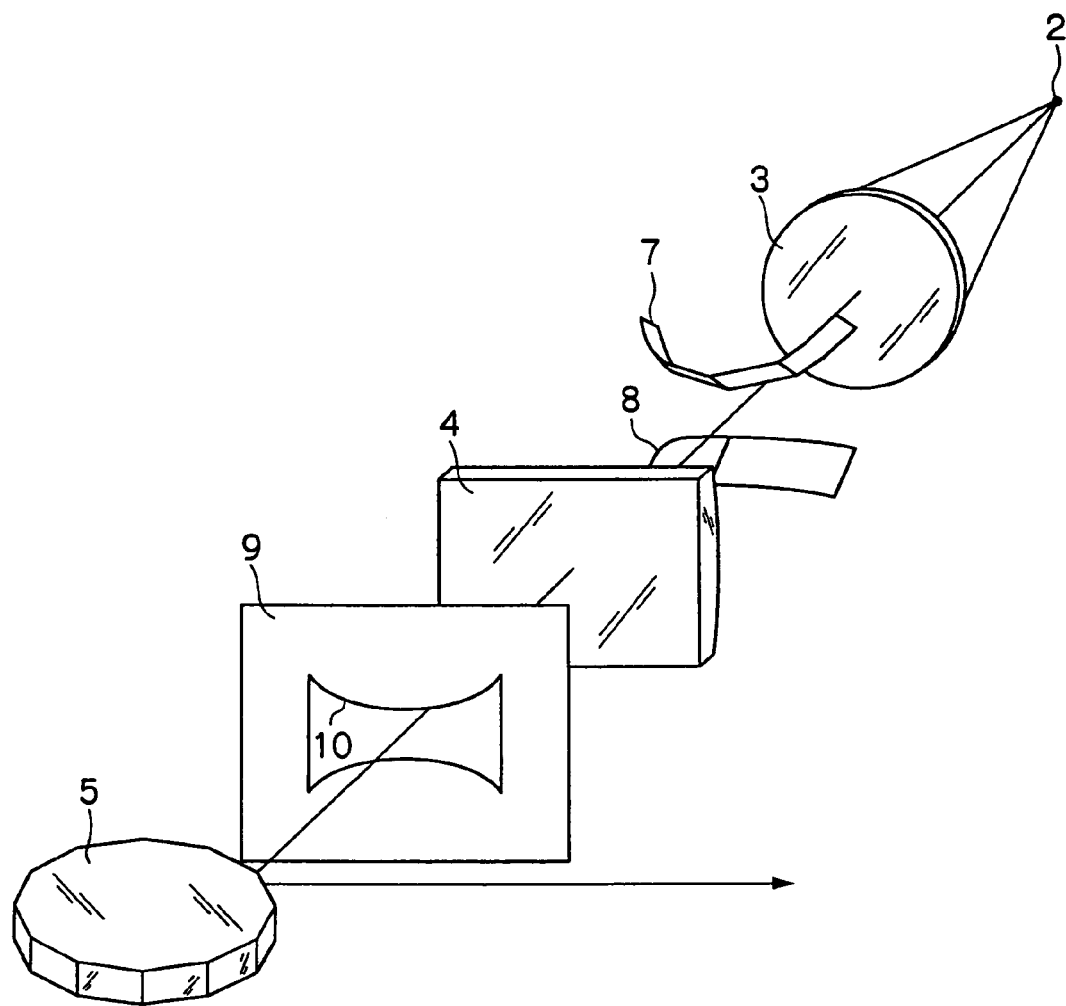
FIG. 12 is a constitutional diagram illustrating a constitution of the optical beam scanning device according to a second embodiment.

FIG. 12 is a diagram illustrating a constitution of the optical beam scanning device according to the second embodiment.

The second embodiment has the laser light source 2 as a light source, the collimating lens 3 for converting diverged light from the laser light source 2 into parallel light, the cylindrical lens 4 for converging the laser beams to the vertical scanning direction, the rotating polygon mirror 5, and the aperture (opening member) composed of a pair of plates 7 and 8.

In the constitution of the second embodiment shown in FIG. 12, parts of the constitution corresponding to those of the constitution in the first embodiment shown in FIG. 1 are designated by corresponding numbers, and the explanation of their functions is omitted.

In this embodiment, the aperture composed of the two plates corresponds to that in the diaphragm device of the present invention.

The plates 7 and 8 composing the aperture are paired vertically in the light advancing direction and have a predetermined angle. The plates 7 and 8 are provided between the collimating lens 3 and the cylindrical lens 4 and are combined so as to form an opening section.

The plates 7 and 8 are provided so as to have a certain angle to the horizontal scanning direction, and thus have a light shielding function for shielding incident light and a light quantity correcting function. The angles to be set on the plates 7 and 8 can be set independently, and, for example, the angles can be set to the same value or different values. In this embodiment, the plates 7 and 8 are installed in positions where the angles are symmetrical with respect to the optical path.

In this embodiment, the installation position of the paired plates 7 and 8 is between the collimating lens 3 and the cylindrical lens 4, but they may be installed in any position as long as the position is between the laser light source 2 and the rotating polygon mirror 5.

In FIG. 12, 9 designates a virtual plane in which the light advancing direction is a normal line, and 10 designates a sectional shape of the laser beam projected on the virtual plane 9. The shape 10 projected on the virtual plane 9 is determined according to the shape of the plates 7 and 8, the installation positional relationship between the plates, and tilt angles of the plates to the horizontal scanning direction.

The shape of the opening section formed by the plates 7 and 8 is explained below.

Figure 13A:
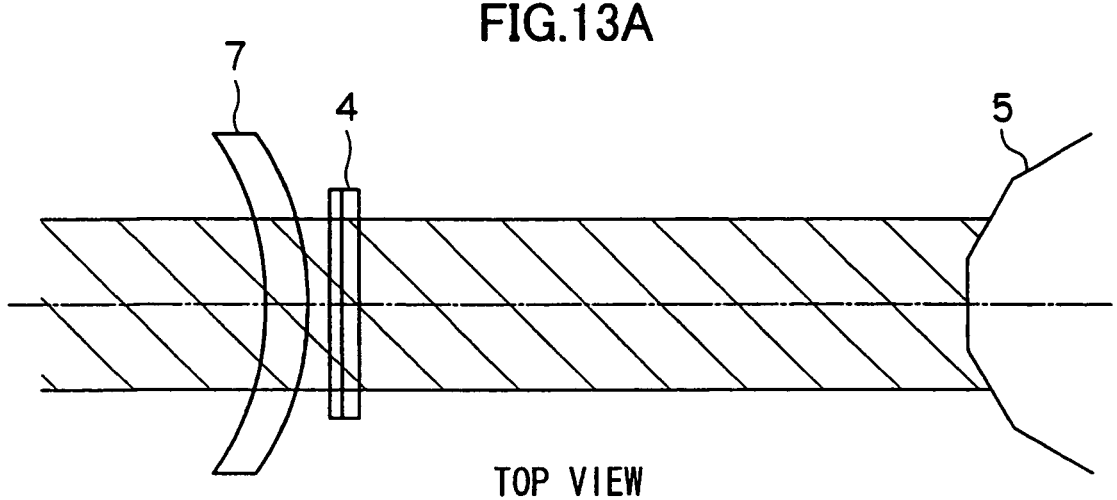
FIGS. 13A to 13C are explanatory diagrams explaining an example of the aperture shape and a state of the passing laser beam in the case of the front incidence according to the second embodiment.
Figure 13B:
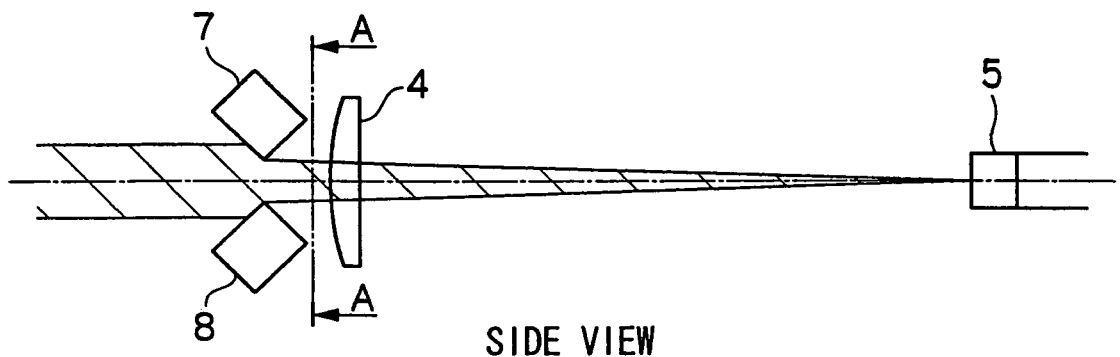
Figure 13C:
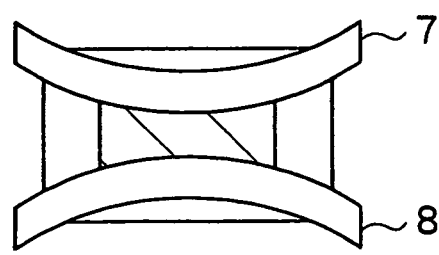
Figure 14A:
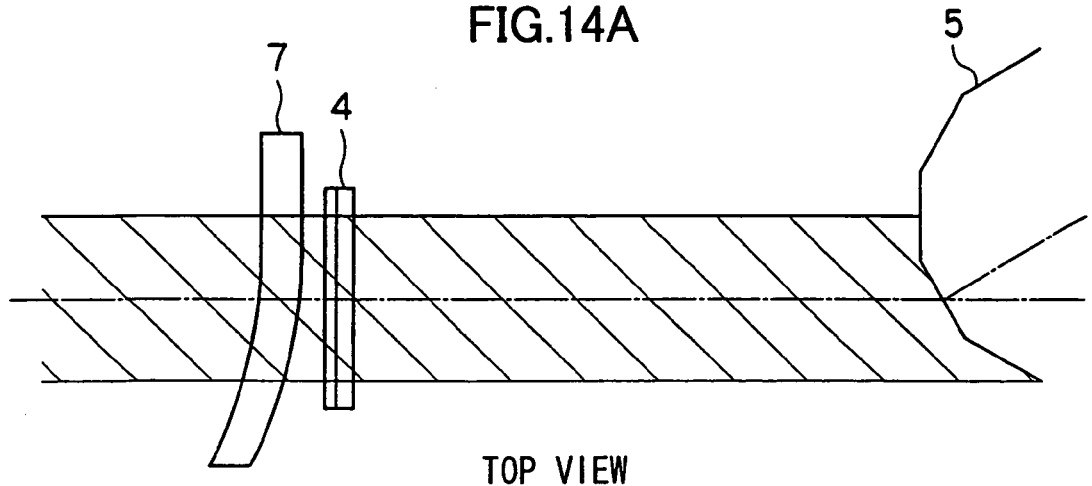
FIGS. 14A to 14C are explanatory diagrams explaining an example of the aperture shape and a state of the passing laser beam in the case of the grazing incidence according to the second embodiment.
Figure 14B:
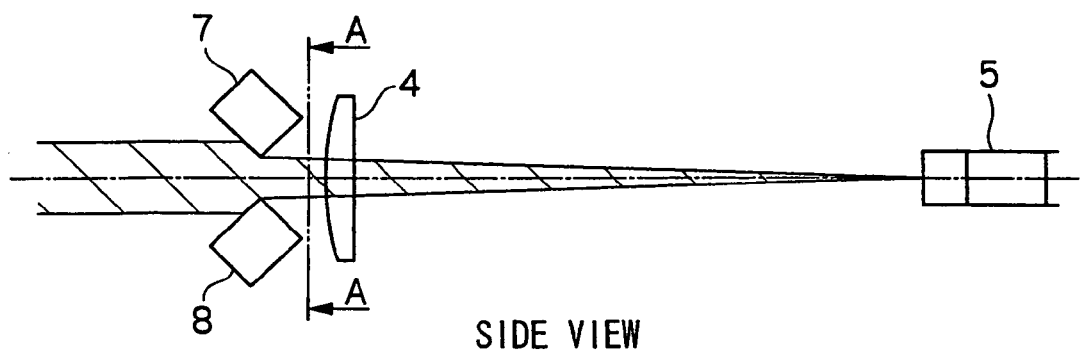
Figure 14C:
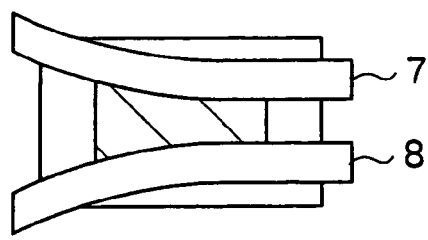

FIGS. 13A to 13C are diagrams explaining a shape example of the opening section formed by the plates 7 and 8 and a state of the laser beam passing through the opening section formed by the plates 7 and 8 in the case of the front incidence. FIGS. 14A to 14C are diagrams illustrating a shape example and a state of the laser beam in the case of the grazing incidence.

The plates 7 and 8 shown in FIG. 13A are positioned symmetrically with respect to the optical axis, and have a curve line shape having curvature such that both ends are deflected uniformly. In order to provide the light shielding function and the light quantity distribution correcting function, the upper plate 7 has a constant angle to a counterclockwise (or clockwise) direction in the horizontal scanning direction, and the lower plate 8 has a constant angle to a clockwise (or counterclockwise) direction in the horizontal scanning direction.

The plates 7 and 8 in the case of the grazing incidence shown in FIG. 14A are positioned symmetrically with respect to the optical axis similarly to the case of the front incidence. The plates. 7 and 8 in the case of the grazing incidence have a shape having large curvature in a direction where the effective reflecting width of the reflecting surface of the rotating polygon mirror 5 decreases.

As not shown, but the plates 7 and 8 may have the binary shape (stepped shape) or the polygonal shape, mentioned above, so that their installation space is decreased and a complicated curvature shape may be easily created.

Their modified examples are explained below. The two-dimensional shape of the-plates, the installation positional relationship between the plates, tilts of the plates, and the like are changed. As a result, the opening shape 10 projected on the plane 9 where the light beam advancing direction is the normal line is changed, and thus the correcting amount of the light quantity distribution may be adjusted.

For example, the installation position of the plates 7 and 8 is moved to the horizontal scanning direction or the plates 7 and 8 are rotated in the horizontal scanning direction so that the tilts of the plates 7 and 8 with respect to the light advancing direction are changed. A moment to the vertical scanning direction is given to both the ends or one end of the plates, so that the plates 7 and 8 may be deformed. For example, the plates 7 and 8 may be rotated about the optical axis of the laser beam.

The deformation or the like of the plates may be adjusted by the deforming adjustment unit or the like explained in the first embodiment based on the measured result of the light quantity distribution on a recording medium.

The plates 7 and 8 are formed by an elastic material such as sheet metal, so that the sectional shape can be deformed easily. A moment is given to both the ends or one end of the plates and deflects the plates, so that the correcting amount of the light quantity distribution can be adjusted.

It is not necessary to deform the upper plate 7 and the lower plate 8 symmetrically, and the plates 7 and 8 may be deformed independently as long as the correcting amount of the light quantity distribution can be adjusted. When the plates 7 and 8 are deformed independently in such a manner, the correcting amount of the light quantity distribution can be adjusted more accurately.

As not shown, but also in the case of the grazing incidence, the plates are deformed and the installation position of the plates is shifted similarly to the case of the front incidence, so that the correcting amount of the light quantity distribution may be adjusted.

This embodiment explains the aperture composed of a pair of the upper plate 7 and the lower plate 8, but an aperture composed of three or more plates can be adopted.

According to the second embodiment, the aperture composed of a plurality of the plates with the two-dimensional shape having the constant angle to the horizontal scanning direction is provided between the laser light source and the rotating polygon mirror. As a result, the light quantity distribution on the sectional shape of the laser beam passing through the opening section formed by the combination of the plates can be corrected.

(C) Third Embodiment

A third embodiment explains a modified example of the diaphragm device according to the first and the second embodiments.

(C-1) The first embodiment explains the curved line shape of the aperture last example. A flat plate having an opening section which is provided vertically to the light advancing direction is adopted, and the deforming adjustment units 20 (see FIG. 11) deform the shape of the flat plate, so that the light quantity distribution may be adjusted.

The shape of the opening section of the aperture is not particularly limited, but it is desirably such that a height in the vertical scanning direction on both ends or one end in the horizontal scanning direction is higher than a height in the vertical scanning direction on the center portion.

The deforming adjustment units 20 move the installation position of the flat-plate aperture and/or changes the shape (for example, certain curvature in the light advancing direction is given to the aperture and it is deflected). Since connection between the deforming adjustment units 20 and the aperture stabilizes the deforming operation of the aperture by mean of the deforming adjustment units 20, it is desirable to provide a fixed point (for example, a protrusion) for fixing the aperture in a position where the light flux of the incident light is not disturbed.

Since the operation of the deforming adjustment units 20 is similar to the operation explained in the first embodiment, its detail is omitted, but the operation can be adjusted according to conditions such as the front incidence and the grazing incidence.

(C-2) In the first embodiment, the opening section has the rectangular shape, but the opening shape can be such that the height in the vertical scanning direction on both the ends or one end in the horizontal scanning direction is higher than the height in the vertical scanning direction on the center portion.

In this case, the opening shape is designed so that when the constant curvature is given to the sectional shape of the aperture, the light quantity distribution on a recording medium is uniformed. As a result, the light quantity distribution is adjusted only by the shape of the sectional curvature of the aperture in the first embodiment, but by the shape of the sectional curvature of the aperture and the opening shape of the aperture in this embodiment. For this reason, the sectional curvature of the aperture can be reduced, and the installation space can be reduced.

Further, the first embodiment can be applied only to the converged light and diverged light, but this modified example can be applied also to the parallel light.

Figures 15A, 15B:
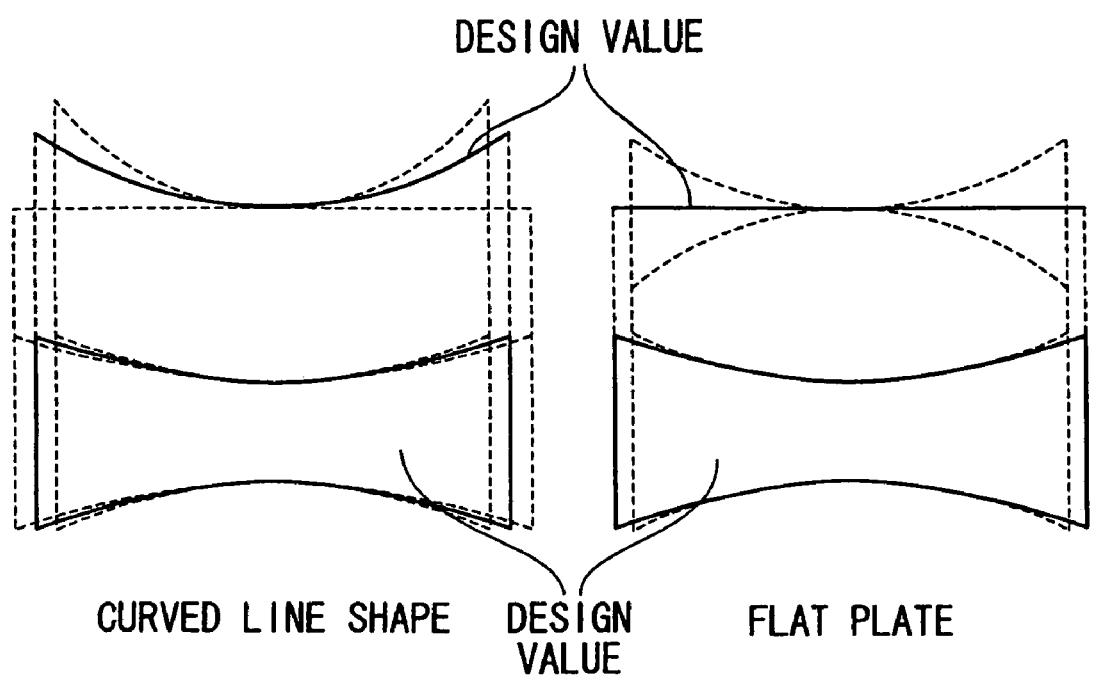
FIGS. 15A and 15B are explanatory diagrams illustrating a difference of light quantity adjustment due to a difference in the aperture shape according to a third embodiment.

FIGS. 15A and 15B illustrate states that the light quantity of the parallel light is corrected. In FIG. 15A, the aperture of the first embodiment, in which the height in the vertical scanning direction on both the ends or one end of the opening shape in the horizontal scanning direction is higher than the height in the vertical scanning direction on the center portion, is adopted. In FIG. 15B, the flat plate aperture, in which the height in the vertical scanning direction on both the ends or one end of the opening shape in the horizontal scanning direction is higher than the height in the vertical scanning direction on the center portion, is adopted. As shown in FIG. 15A, the opening shape is designed so that when a certain curvature is given, the light quantity distribution is uniformed. As a result, when the curvature is increased, a quantity of the light passing through both the ends of the aperture is increased, but when the curvature is decreased, the quantity of the light passing through both the ends of the aperture can be reduced. That is to say, the light quantity can be adjusted to be increased or decreased. On the contrary, the opening shape is designed so that the light quantity distribution is uniform at the time of plane as shown in FIG. 15B. In this case, when the curvature is given in any directions, the light quantity is increased but cannot be decreased.

What is claimed is:

1. An optical beam scanning device, comprising:
   a light source;
   a deflection reflecting surface for deflecting to scan light from the light source on a recording medium; and
   a diaphragm device provided between the light source and the deflection reflecting surface, the diaphragm device having an aperture formed by a nonplanar light shielding section, the light shielding section making a light shielding quantity of the light from the light source in a vertical scanning direction different in positions of a horizontal scanning direction and a light advancing direction,
   wherein the diaphragm device includes a movable adjustment section for shifting an installation position of the light shielding section and deforming the light shielding section in the horizontal scanning direction, so that light quantity distribution on the recording medium becomes uniform.

2. The optical beam scanning device according to claim 1, wherein the diaphragm device disposed between the light source and the deflection reflecting surface has an aperture on a surface of the light shielding section, the aperture having a shape such that a length in a direction crossing the horizontal scanning direction on both ends or one end in the horizontal scanning direction is larger than a length on a center portion in the horizontal scanning direction.

3. An optical beam scanning device, comprising:
   a light source;
   a deflection reflecting surface for deflecting to scan light from the light source on a recording medium; and
   a diaphragm device provided between the light source and the deflection reflecting surface, the diaphragm device having an aperture formed by a nonplanar light shielding section, the light shielding section making a light shielding quantity of the light from the light source in a vertical scanning direction different in positions of a horizontal scanning direction and a light advancing direction, wherein a sectional shape of the light shielding section in the horizontal scanning direction is a two-dimensional shape, a sectional shape of light flux passed through the aperture on the a surface of the two-dimensional light shielding section is such that light on a portion of the recording medium where a light quantity is large is reduced and light on a portion where the light quantity is small is increased, and wherein the diaphragm device includes a movable adjustment section for shifting an installation position of the light shielding section and deforming the light shielding section in the horizontal scanning direction, so that light quantity distribution on the recording medium becomes uniform.

4. The optical beam scanning device according to claim 3, wherein the diaphragm device disposed between the light source and the deflection reflecting surface has an aperture on a surface of the light shielding section, the aperture having a shape such that a length in a direction crossing the horizontal scanning direction on both ends or one end in the horizontal scanning direction is larger than a length on a center portion in the horizontal scanning direction.

5. An optical beam scanning device, comprising:
a cylindrical lens for condensing light from a light source;
a deflection reflecting surface for deflecting to scan the light from the light source on a recording medium;
a single aperture plate provided between the cylindrical lens and the deflection reflecting surface, aperture of the aperture plate on a surface having a shape such that a length in a direction crossing a horizontal scanning direction on both ends or one end in the horizontal scanning direction is larger than a length on a center portion in the horizontal scanning direction; and
a movable adjustment section for shifting an installation position of the aperture plate and giving certain curvature to the single aperture plate and forming a sectional shape of the single aperture plate in the horizontal scanning direction to be a curved line shape so as to adjust light quantity distribution on the recording medium uniformly.

6. An optical beam scanning device, comprising:
a light source;
a deflection reflecting surface for deflecting to scan light from the light source on a recording medium;
a single aperture plate provided between the light source and the deflection reflecting surface, an aperture of the aperture plate on a surface having a shape such that a length in a direction crossing a horizontal scanning direction on both ends or one end in the horizontal scanning direction is larger than a length on a center portion in the horizontal scanning direction, sectional shape of the aperture plate in the horizontal scanning direction being a two-dimensional shape; and
a movable adjustment section for shifting an installation position of the aperture plate and giving certain curvature to the single aperture plate and forming a sectional shape of the single aperture plate in the horizontal scanning direction to be a curved line shape so as to adjust light quantity distribution on the recording medium uniformly.

7. A diaphragm device, comprising:
an aperture on a surface of a nonplanar light shielding section,
wherein the light shielding section shields light so that a position where incident light of converged/diverged light or parallel light is shielded is differed with a light advancing direction according to positions in a light section; and
a movable adjustment section for moving an installation position of the light shielding section and deforming the light shielding section in the horizontal scanning direction,
wherein light quantity distribution is adjusted on a surface in a predetermined position to which light passing through the aperture is emitted by shift and deformation of the light shielding section using the movable adjustment section.

8. A diaphragm device, comprising:
an aperture on a surface of a nonplanar light shielding section,
wherein the light shielding section determines a quantity of incident light of converged/diverged light or parallel light to be shielded according to positions in a light section and positions of a light advancing direction; and
a movable adjustment section for moving an installation position of the light shielding section and deforming the light shielding section in the horizontal scanning direction,
wherein light quantity distribution is adjusted on a surface in a predetermined position to which light passing through the aperture is emitted by shift and deformation of the light shielding section using the movable adjustment section.

* * * * *